Jan. 18, 1927. 1,614,455
A. H. COOKE
REFRIGERATING APPARATUS
Filed August 20 1925   3 Sheets-Sheet 1

Jan. 18, 1927.
A. H. COOKE
1,614,455
REFRIGERATING APPARATUS
Filed August 20, 1925    3 Sheets-Sheet 2
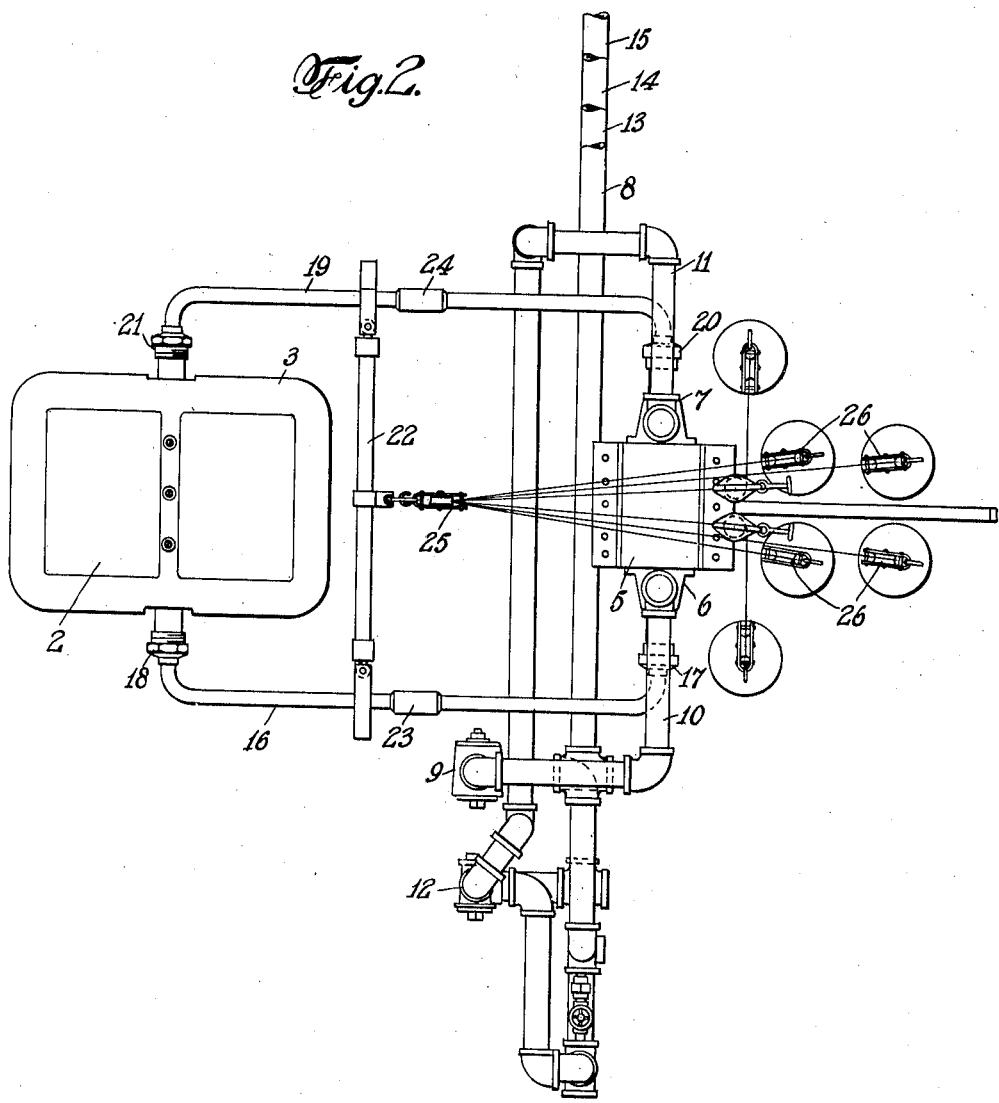

Jan. 18, 1927.
A. H. COOKE
1,614,455
REFRIGERATING APPARATUS
Filed August 20, 1925   3 Sheets-Sheet 3
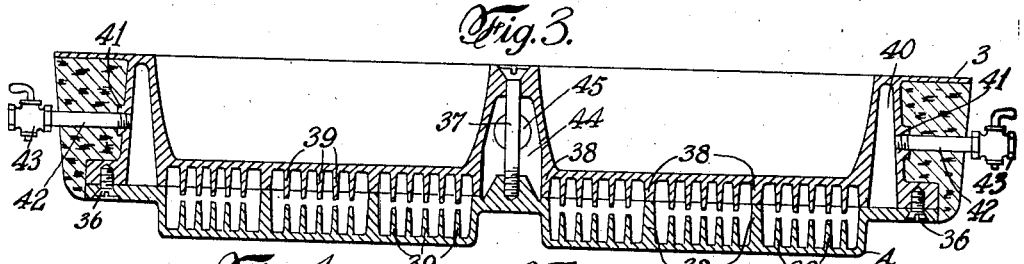
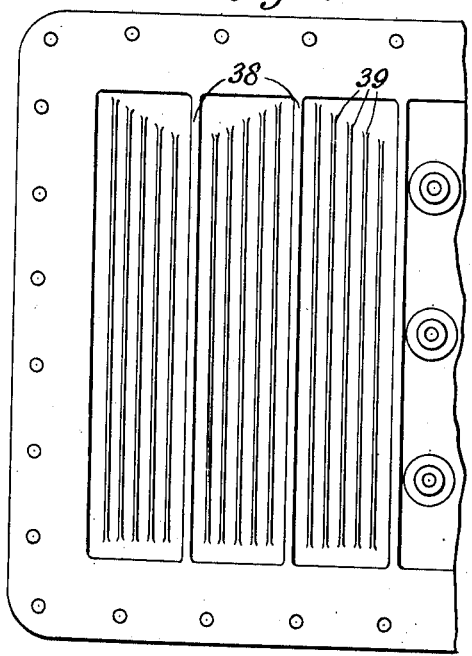
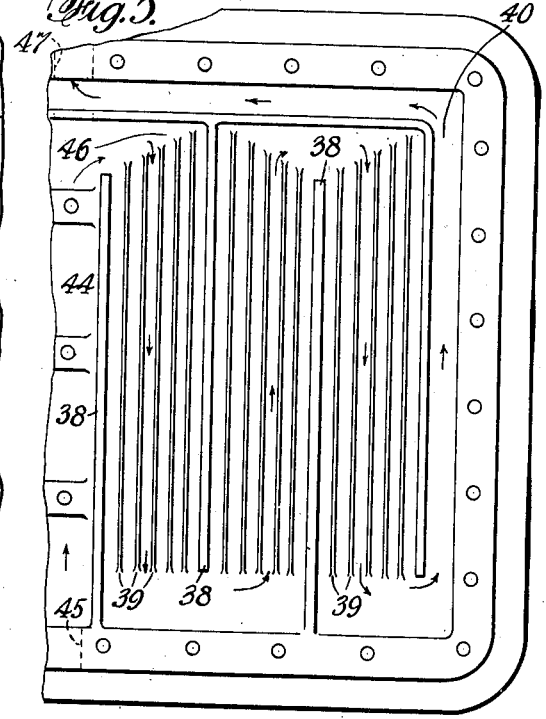
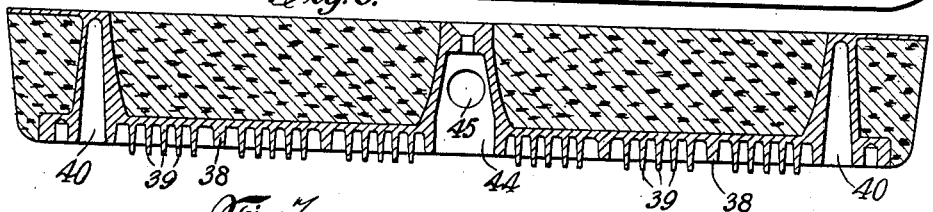
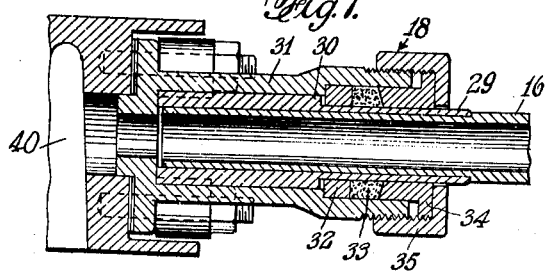

Patented Jan. 18, 1927.

1,614,455

UNITED STATES PATENT OFFICE.

ALEXANDER H. COOKE, OF NEW YORK, N. Y., ASSIGNOR TO ATLANTIC COAST FISH-ERIES CORPORATION OF NEW YORK, OF NEW YORK, N. Y., A CORPORATION OF NEW YORK.

REFRIGERATING APPARATUS.

Application filed August 20, 1925. Serial No. 51,343.

My invention relates to the art of refrigeration and particularly to that branch of refrigeration which relates to preserving food and food products by freezing.

One of the objects of my invention is to provide a means for freezing comestibles and particularly fish so as to preserve the fish, or other comestible, as nearly as possible in its original condition and to prevent injury to the product during the freezing process.

Another object of my invention is to produce a device which will freeze the fish in the shortest possible time.

A still further object of my invention is to provide a device in which the freezing medium cannot accidentally come in contact with the product, and to provide a device that can be used on board fishing vessels and the like so that the fish can be frozen immediately upon being caught.

In many devices used for freezing fish and other food products the brine or freezing medium is contained in tanks and the fish or other food placed in containers immersed in the freezing medium. Such a device as this cannot be used on board ship for the reason that the motion of the vessel would cause the refrigerant to be splashed about, thereby giving it an opportunity to come in contact with the fish either due to the splashing caused by the rolling of the vessel or due to the fact that all of the refrigerant may not have been thoroughly removed from the containers before the containers are opened.

In my device the refrigerant is entirely enclosed and cannot come in contact with the food product either by splashing on it or by dripping upon it when the containers are opened.

Other objects and certain advantages of the invention will become apparent from the following description when taken in connection with the accompanying drawings in which:

Figure 2 is a plan view of my device.

Figure 3 is a sectional view of one of the containers showing the radiating fins and passages for the refrigerant.

Figure 4 is a plan view of the inside of the lower half of one of the containers.

Figure 5 is a plan view of the inside of the upper half of one of the containers.

Figure 6 is a sectional view of the upper half of the top cover showing the insulation material.

Figure 7 is a sectional view of the joint used in forming the brine connections.

Figure 1:
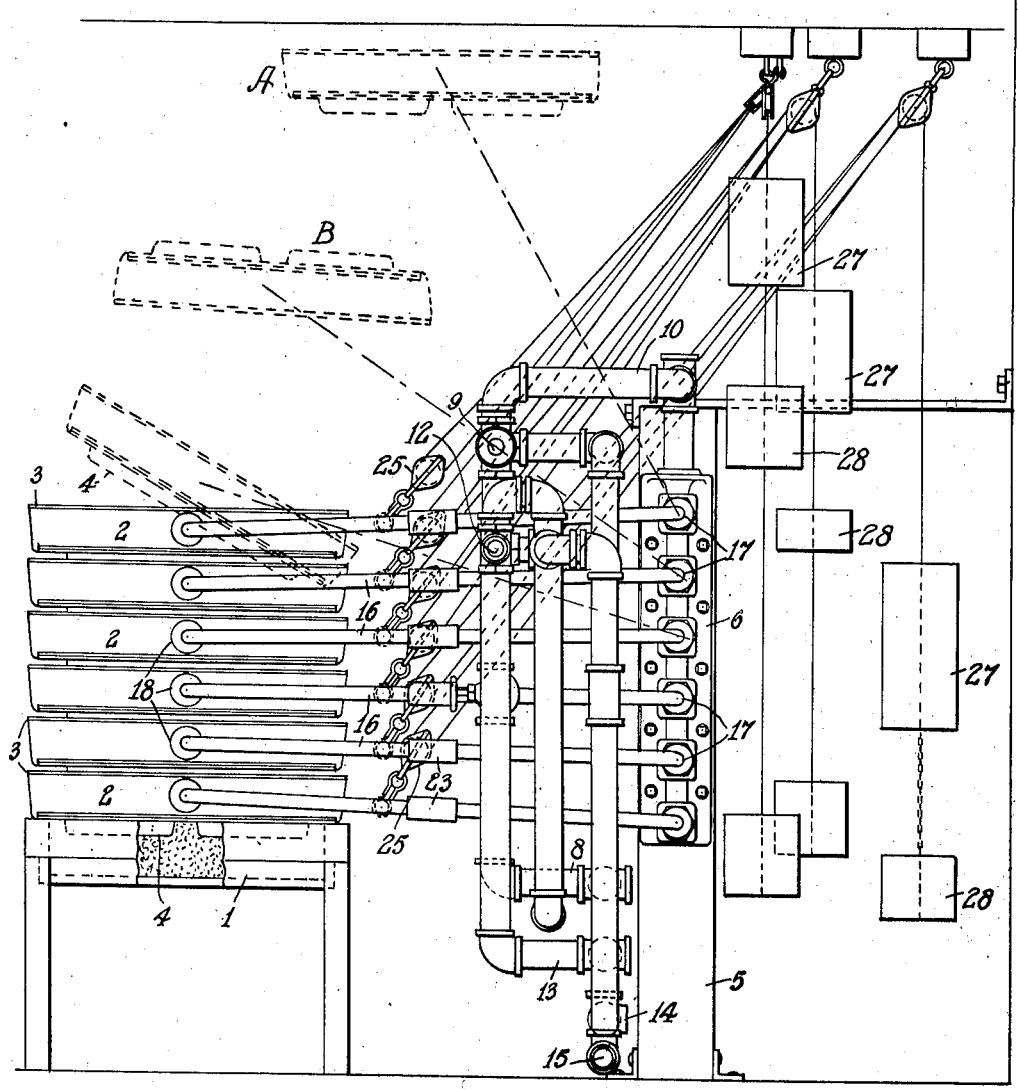
Figure 1 is a side elevation of my device showing the containers and the brine connections.

In Figure 1 a supporting frame 1 is adapted to support the containers 2. Each container is supplied with a flange 3 and a depressed bottom 4. The depressed bottom 4 is adapted to make a close fit with the container below and forms a cover therefor. The containers nest into one another as shown in the drawing. The top container forms the cover of the next lower container, the lowest container resting on the frame 1. A standard 5, which may be of wood or iron, or any other material, forms a support for a brine intake manifold 6 and a brine return manifold 7. The brine intake manifold 6 may be considered as the source of refrigerant for the purposes of this application and is connected to a cold brine supply pipe 8, through a three-way valve 9, and a pipe 10. The cold brine outlet is connected with the outlet manifold 7 by a pipe 11, a three-way valve 12, and thence through a pipe 13. Warm brine is supplied to the inlet manifold 6 through a pipe 14, three-way valve 9 and pipe 10. The warm brine is exhausted from the outlet manifold 7, through the pipe 11, the three-way valve 12, and a pipe 15. The function of the warm brine will be explained later. Each container is connected to the brine intake manifold 6 by an intake supply pipe 16 which is swiveled on the brine intake manifold 6 by means of a joint 17 and on the container by means of a joint 18. The outlet brine manifold 7 is connected to the container through a pipe 19 which is swiveled to the brine outlet manifold 7 by a joint 20 and to the container 2 by a joint 21. These two pipes are connected by a yoke 22. These pipes 16 and 19 are made in two sections, each section being joined by couplings 23, 24 respectively. These couplings form an adjustment enabling the containers 2 to be moved nearer to or further from the support 5 so as to bring the containers in exact alignment with each other in order that they will nest exactly.

To the yokes 22 are secured pulleys 25. These, in turn, are connected by cables to pulleys 26, which, in turn, support weights 27, 28, each yoke being supplied with two weights, the uppermost weight being adapted to counterbalance a portion of the weight of the container, the connecting pipes and the brine circulating in the double walls of the container, while the lowermost weight 28 is adapted to counterbalance the weight of the fish placed in the container and the rest of the weight of the containers. Thus, when the containers are raised, as shown in dotted lines in Figure 1, the lowermost weight 28 will come to rest against a stop which in the present case is the floor. The arrangement of these weights is important since they automatically determine the filling and emptying position of the containers. When the frozen fish is emptied out the weight 27 will be sufficient to balance the empty container 2 and permit it to be raised to a still higher position out of the way so that the next container may be emptied. It is obvious that when the containers are nested one into the other in position for freezing there will be no more weight on the fish in the lower container than on the fish in the upper container, since the entire weight of the container and fish is counterbalanced by the weights 27 and 28. When the containers are nested into position for freezing, a weight, not shown, is placed on the topmost container. This weight will be of sufficient size to resist to some extent the expansion of the fish which takes place in each container as the freezing process is in operation. From this description it is apparent that this weight will be evenly distributed throughout the entire stack of containers, since, as I have said, the weight of the container and of the fish placed therein is compensated for by the weights 27 and 28.

The joints 17, 18, 20 and 21 are all of the same construction. Turning to Figure 7, the pipe 16 has upon it a sleeve 29 which is secured to it, by welding or any other well-known means, to render the joint between it and the pipe 16 brine-proof. The sleeve 29 has a shoulder 30. This enlarged or shoulder portion 30 fits closely within the body joint 31. This body portion is enlarged at its outer end to form a stuffing box in which is first placed a metallic washer 32, then a packing 33 which may be of any brine-resisting material, and thereafter a follower 34 is forced down by a threaded collar 35. Thus the packing material is forced in very tightly around the sleeve 29. The metal washer 32 is adapted to take the wear of the shoulder 30 of the sleeve 29 and to prevent friction due to end thrusting of packing. This construction allows the joint to move without leakage of brine, and the joints act as trunnions on which a container 2 pivots, thereby enabling it to be moved into different positions without disconnecting the brine connections.

The containers 2 are shown in two sections as indicated in Figure 3. These can be cast integral if desired. These sections are held together by screws 36, 37, and the joint made tight around the edge by welding. Each of these sections has cast upon it ribs 38. The ribs of each section are machined so as to make a close fit when the sections are secured together, thereby forming passages within the double walls of the container 2. These passages are for the purpose of directing the flow of brine. Fins 39 are also cast on the inside walls of the two sections of the container 2. These fins are so formed as to allow a small space between the edges of the fins, permitting the brine to flow freely around them. The top portion of the container 2 is provided with a hollow wall portion 40 which permits the brine to circulate around the walls of the container. Each of these side walls is provided with an opening 41 into which a pipe 42 is fitted. Each pipe is provided with a petcock 43. The purpose of these valves is to permit any air which may be entrapped between the double walls of the container to be released at the will of the operator. The containers are shown with a heat insulating covering which may be a composition of ground cork or any other suitable material. The hollow space in the top cover which would normally contain fish is also filled with insulating material, as shown in Figure 6, and the table into which the first container fits is also insulated, as shown in Figure 1.

The flow of cold brine through the device is as follows:

The cold brine enters from the brine supply through the pipe 8, the three-way valve 9, through the pipe 10, intake manifold 6, through the joint 17, pipe 16, joint 18, into the passage 44, through an opening 45 in the double wall of the container 2. From the passage 44, it flows through the opening 46 in the rib 38, down between the fins 39 in the direction of the arrow, through the opening in the rib 38, back through the next passage in the direction of the arrow, and following the direction of the arrow, through the next passage into the side wall 40. It circulates through the side wall 40, out through an opening 47 in the opposite side of the container 2, similar to 45, through the joint 21, pipe 19, joint 20, into the brine return manifold 7, thence through the pipe 11, three-way valve 12, and the pipe 13 back to the source of supply. The flow of the warm brine is very similar except the warm brine enters through the pipe 14, thence through the valve 9, from which point it follows through the same path as the cold brine until it leaves the outlet manifold 7. From the manifold 7 the brine flows through the pipe 11 to the three-way valve 12 and back to the warm brine supply through the pipe 15.

In Figure 6 I have shown a form of cover similar to the containers, the wells of the container being filled with insulating material. This figure shows the upper half of a container as shown in Figure 3, the depressed bottom being omitted from this figure, although of course it would be obvious that such a bottom is used in conjunction with the structure shown in Figure 6 to form the double walled cover for the top container. It is obvious that a form of cover may be devised, different from the standard container unit, in which the side wall passage 40 would be restricted to a size merely to permit the return flow of the brine.

The operation of my device is as follows: The cover section is first raised and turned slightly so that it fits snugly against the ceiling as at A in Figure 1, or, if the room is slightly higher it is simply raised well up out of the way. Then each container is consecutively raised and turned upside down, so that they occupy a position similar to that shown at B, Figure 1. The first or top one is raised until it is stopped from further travel by the cover and each consecutive unit is stopped by bringing up against the one above. The wells of the container for the reception of comestibles are now opening downward and a pan or form designed to fit easily into the wells of the containers and each containing fish or other comestibles is then placed in each of the wells of the lower container which is then turned over into an upright position. During this turning process the contents of the pans will be transferred to the wells of the containers. The container is then swung downward until it rests on the support 1. This operation is repeated for each of the containers; the bottom of the second container forms the cover of the first one and in turn the bottom of each consecutive container forms the cover of the one beneath it. The top container being used merely as a cover contains nothing to be frozen, the wells of this container being filled with insulating material as shown in Figure 6. A weight is then placed on the top cover to offer resistance to the expansion which naturally takes place when the fish is in the process of freezing. The three-way cock 9 is then opened permitting the cold brine to flow from the supply pipe 8, through the valve 9, pipe 10, through the manifold 6, through the joint 17, pipes 11, joints 18, between the walls of the container 2, thence following through the brine passages, as has heretofore been described, out through the joints 21, pipes 19, joints 20, into the return manifold 7, thence through the pipe 11, three-way valve 12, and through the return pipe 13. This circulation of brine is continued until the freezing is completed. After the freezing is completed the operation is as follows:

The three-way cock 9 is turned, shutting off the cold brine supply and turning on the warm brine supply. The warm brine supply flows through the pipe 14, valve 9, pipe 10, intake manifold 6, joint 17, pipe 16, joint 18, pipe 21, pipe 19, joint 20, return manifold 7, pipe 11, valve 12, and return pipe 15. The valve 12 however, in this operation is not disturbed until a sufficient amount of warm brine has been allowed to flow through the pipes and through the containers to drive cold brine ahead of it. As soon as the cold brine has been displaced by the warm brine the valve 12 is turned, thereby returning the warm brine into the warm brine supply and shutting off all connection with the cold brine supply. The warm brine tends to loosen the frozen fish from the containers. The cover is then opened and lifted in the position shown in dotted lines in Figure 1. The first container is lifted up and tilted in a position marked B, permitting cakes of fish to fall out into the hands of the operator. Each container is emptied in a similar manner. The warm brine continues to flow through the walls of the containers loosening all the ice which would otherwise adhere to the walls of the containers, permitting them to be cleaned readily. After the containers have been cleaned they are recharged as has been described. At the same time the valve 9 is turned shutting off the supply of warm brine and permitting the supply of cold brine to circulate through the manifolds and between the walls of the containers. As soon as the cold brine has driven out all of the warm brine ahead of it, the valve 12 is opened permitting the cold brine which is circulating through the manifolds and through the containers to return to the cold brine supply. The various steps outlined may be repeated as often as desired until all the fish is frozen.

I claim:

1. A refrigerating device having a series of double-walled containers, said containers arranged so that the bottom of one container forms the cover for the next lower container, and means for circulating a refrigerating medium between the walls of each container.

2. A refrigerating device having a plurality of double-walled containers adapted to nest one within the other, the bottom of each container being adapted to fit within the next lower container to form a closure therefor, and means for circulating a refrigerating medium between the walls of each container.

3. A refrigerating device having an upright support, a refrigerant connection secured to said support, a refrigerant pipe movably connected to said connection at one end, a double-walled container movably connected to the pipe at its other end, a double-walled cover for said container, a refrigerant pipe movably connected to the cover at one end and to the refrigerant connection at the other end, and means for circulating brine through said pipes and between the walls of the container and between the walls of the cover respectively.

4. A refrigerating device having a support, refrigerant connections secured to said support, refrigerant pipes movably secured to said connections at one end, a plurality of double-walled containers movably connected to said pipes at the other end, means for circulating a refrigerant through said pipes and between the walls of said containers, and means for moving said containers so that the one container forms the cover of the next lower container.

5. In a refrigerating device, a support, a plurality of manifolds secured to said support, a plurality of pipes pivotally connected to said manifolds, a plurality of double-walled containers pivotally connected to the opposite ends of said pipes, means for circulating a refrigerant through said pipes and the walls of said containers, and means for raising and lowering said containers on their pivots whereby the bottom of one container forms the cover of the next lower container.

6. A refrigerating device having a double-walled container, a support, a pair of arms trunnioned on the support at one end and trunnioned on the container at the other end, means for raising and lowering said container on said trunnions, and means for circulating a refrigerant through the walls of said container.

7. A refrigerating device having a double-walled container, a double-walled cover therefor, a source of refrigerant supply, movable connections between the container and said supply, movable connections between the cover and said supply, and means for moving the cover into and out of relation with the container without disconnecting the refrigerant supply.

8. In a refrigerating device, a series of double-walled containers, a double-walled cover therefor, a source of refrigerant supply, pairs of movable connections between each container and said supply, and means for moving the containers into and out of relation with each other without disconnecting said supply.

9. A refrigerating device having a support, manifolds mounted on said support, pairs of pipes trunnioned on said manifolds, a plurality of double-walled containers trunnioned on the opposite end of each pair of pipes, the containers so arranged that they will nest into one another so that the bottom of one container forms the cover of the next lower container, a support for the containers, a double-walled cover for the top container, a pair of pipes connecting said cover to the manifolds, said pipes being trunnioned on the cover at one end and on the manifolds at the other, and means for circulating a refrigerant through the manifolds, through each pair of pipes and through each container.

10. A refrigerating device having a double-walled container, a support for said container, a double-walled cover for said container, movable connections for the container and for the cover, means for circulating a refrigerant between the walls of the container and between the walls of the cover, means for moving the cover relative to the container and to the container support, and means for moving the container relative to the cover and to the container support without disconnecting the refrigerant connections.

11. A refrigerating device having a plurality of double-walled containers, a frame adapted to support the lower container, each of the containers being arranged so that the bottom of one container forms the cover for the next lower container, a double-walled cover for the top container, movable refrigerant connections for each container and for the cover, means for moving the cover into and out of relation with the top container and with the other containers, and means for moving the other containers into and out of relation with each other without disconnecting the connections.

12. A refrigerating device having a support, a manifold secured to said support, means for supplying a refrigerant to the manifold, a double-walled container, a connection between the manifold and the double-walled container, means for raising and lowering the container, means for tilting the container, and means for circulating the refrigerant through the walls of the container regardless of the position of the container.

13. A refrigerating device having a support, a double-walled container adapted to rest on said support but movable therefrom, a cover for said container, and means for circulating a refrigerating medium between the walls of said container when on said support or when removed therefrom.

14. A refrigerating device having a double-walled container adapted to receive a refrigerant therebetween, a support for said container, a double-walled cover for said container adapted to receive a refrigerant therebetween, the container and the cover being supplied with ducts for the circulation of the refrigerant, the cover and the container being adapted to be moved in varying positions relative to each other, and means for circulating a refrigerant through the ducts and through the container and the cover respectively in whatever position the cover and ducts may be placed.

15. A refrigerating device having a base, a double-walled container movably mounted thereon, a double-walled cover for said container also movably mounted, counterweights for said container and for said cover, and means for flowing a refrigerant between the double walls of the container and the double walls of the cover respectively.

16. A refrigerating device having a double-walled container and a double-walled cover, said double-walled container and double-walled cover being movably mounted so as to each move relative to the other, refrigerant passages within the hollow walls of the container, and means for supplying a refrigerant to the container and to the cover respectively, in any of their positions.

17. A refrigerating device having a double-walled container and a double-walled cover, said double-walled container and double-walled cover being movably mounted so as to each move relative to the other, refrigerant passages within the hollow walls of the container, refrigerant passages within the hollow walls of the cover, and means for supplying a refrigerant to the container and to the cover respectively, in any of their positions.

18. A refrigerating device consisting of a support, manifolds mounted on said support, pairs of pipes trunnioned on said manifolds, a plurality of double-walled containers trunnioned on the opposite ends of each pair of pipes, the containers so adapted that the bottom of one container forms the cover of the next lower container, a double-walled cover for the top container, a pair of pipes connecting said cover to the manifolds, the pipes being trunnioned on the cover at one end and on the manifolds at the other, counterweights for each container and for the cover, a source of cold refrigerant and a source of warm refrigerant, means for circulating cold refrigerant between the double walls of each container and between the double walls of the cover, and means for circulating warm refrigerant between the double walls of each container and the double walls of the cover at the will of the operator.

19. A refrigerating device comprising a container, a source of refrigerant, means for supporting said container in a plurality of positions in respect to said source, and means permanently connecting said container to said source and adapted to supply refrigerant to said container in each of said positions.

20. A refrigerating device comprising a container, a source of refrigerant, means for supporting said container in a plurality of positions in respect to said source, means permanently connecting said container to said source and adapted to supply refrigerant to said container in each of said positions, and means for holding said container in each of said positions.

21. A refrigerating device comprising a container, a source of refrigerant, means for supporting said container in a plurality of positions in respect to said source, means permanently connecting said container to said source is all of said positions, a source of warm liquid, and means permanently connecting said source to said container in all of said positions whereby either cold or warm liquid may be supplied to said container when it occupies any one of said positions.

22. A refrigerating device comprising a container, means for supporting said container in a plurality of positions, counterbalancing means to retain said container in position, said means comprising two weights, one adapted to balance the container when empty and the other adapted to balance the contents alone, and means for supplying a refrigerant to the container in any one of its positions.

23. A refrigerating device comprising a container, means for supporting said container in a plurality of positions, counterbalancing means to retain said container, said means comprising two weights, one adapted to balance the container when empty and the other adapted to balance the contents alone, and means for supplying refrigerant to said container in each of said positions.

24. A refrigerating device comprising a plurality of containers, means for holding said containers one above the other and supporting one another, means for supporting the lowest of said containers, each container furnishing a cover for the one beneath it, a cover for the topmost container, means to move said containers upwardly in succession, and means for supplying refrigerant to said containers in any position which they may occupy.

25. A refrigerating device comprising a plurality of containers, means for holding said containers one above the other and supporting one another, means for supporting the lowest of said containers, each container furnishing a cover for the one beneath it, a cover for the topmost container, means to move said containers upwardly in succession, means for supplying refrigerant to said containers in any position which they may occupy, and means permitting the tipping of the topmost container to empty the contents therefrom.

26. A refrigerating device comprising a container, a source of refrigerant, means for supporting said container in a plurality of positions in respect to said source, means permanently connecting said container to said source and adapted to supply refrigerant to said container in each of said positions, and means for circulating the refrigerant through the container, said means maintaining the refrigerant out of contact with the contents of the container.

27. A refrigerating device comprising a container and a cover therefor, a source of refrigerant, means for supporting both said container and said cover in any one of a plurality of positions in respect to said source, and means permanently connecting both said container and said cover to said source and adapted to supply refrigerant thereto in each of said positions.

28. A refrigerating device comprising a container and a cover therefor, a source of refrigerant, means for supporting both said container and said cover in any one of a plurality of positions in respect to said source, means permanently connecting both said container and said cover to said source and adapted to supply refrigerant thereto in each of said positions, and means for circulating the refrigerant through the container and the cover in each of said positions.

29. A refrigerating device comprising a container and a cover therefor, a source of refrigerant, means for supporting both said container and said cover in any one of a plurality of positions in respect to said source, means permanently connecting both said container and said cover to said source and adapted to supply refrigerant thereto in each of said positions, and means for circulating the refrigerant through the container and the cover in each of said positions, said means maintaining the refrigerant out of contact with the contents of the container.

30. A refrigerating device comprising a container, a source of refrigerant, means for supporting said container in a plurality of positions in respect to said source, means permanently connecting said container to said source and adapted to supply refrigerant to said container in each of said positions, and means for circulating the refrigerant through the container.

31. A refrigerating device comprising a container, means for supporting said container in a plurality of positions, means for supplying refrigerant to said container in each of said positions, and a pivotal connection between said container and said supporting means permitting the tipping of said container to permit removal of the contents thereof.

In testimony whereof, I have affixed my signature to this specification.

ALEXANDER H. COOKE.